July 9, 1957 W. LEIRER 2,798,548
CUTTING MACHINE FOR CUTTING EXTRUDED PLASTICS
Filed April 28, 1955 2 Sheets-Sheet 1

INVENTOR
WALTER LEIRER.
BY
ATTORNEY

INVENTOR
WALTER LEIRER.
ATTORNEY

United States Patent Office 2,798,548
Patented July 9, 1957

2,798,548

CUTTING MACHINE FOR CUTTING EXTRUDED PLASTICS

Walter Leirer, New Hyde Park, N. Y.

Application April 28, 1955, Serial No. 504,526

1 Claim. (Cl. 164—48)

This invention relates to a cutting machine for cutting extruded plastics.

A serious problem in the plastics extrusion industry relates to cutting the extruded plastics to predetermined lengths during the course of extrusion process and without any interference with said process. The conventional practice is to cut long lengths of extruded plastics, by various means, and then to bundle a quantity of such lengths together and cut them all simultaneously to desired lengths on a conventional cut-off machine such as a saw, either a band saw or a power-driven hack saw. Attempts have been made to utilize a punch press equipped with a cutter to cut the extruded plastics to predetermined length during the extrusion process. These attempts have proved wholly unsatisfactory for the reason that a punch press functions much too slowly for this purpose. The cutting stroke interferes with the forward movement of the extruded plastics and tends to deform it where it is still plastic. The return stroke of the cutter further interferes with and obstructs the advance of the extruded plastics and again deformation of its plastic portions takes place.

The principal object of this invention is the provision of a cutting machine which operates with such speed as to cut extruded plastics during the normal course of an extrusion process without obstructing the forward movement of said plastics. What applicant uses is a powerful solenoid as the motive force which actuates the cutter. There is a very simple linkage between the solenoid and the cutter so that when the solenoid is energized its operation is transmitted directly and virtually instantaneously to the cutter and the cutting operation is begun and completed in that split second between the time the solenoid is energized and the time its plunger or core is brought to retracted position.

Another important object of this invention is the provision of a solenoid-actuated cutter which traverses the path of the forwardly moving extruded plastics only during the cutting stroke and which by-passes said path on the return stroke. The cutter is pivotally mounted on an axis which parallels the longitudinal path of movement of the extruded plastics. The cutting edge of the cutter is conventional. The back edge is cam-shaped. On the cutting (downward) stroke, the cutter passes through the extruded plastics and severs it. In that brief moment before the cutter retracts to its original position, the extruded plastics moves forwardly a sufficient distance to obstruct such backward (upward) movement of the cutter. The back edge of the cutter accordingly engages the extruded plastics and cams the cutter off to the side and enables the cutter to return to its original position without traversing the path of the forwardly moving plastics.

Another important object of this invention is the provision of adjustable measuring means for measuring the forwardly moving extruded plastics and actuating the solenoid when a predetermined length of the plastics passes a given point. This mechanism involves the use of a trip member which is situated in the path of the forwardly moving plastics and when said trip member is engaged by the plastics, it closes a circuit to the solenoid, thereby energizing the same and actuating the cutter. The severed length of plastics is now free to drop into a collecting receptacle or the like.

The invention is illustrated in the accompanying drawing in which.

Figure 1:
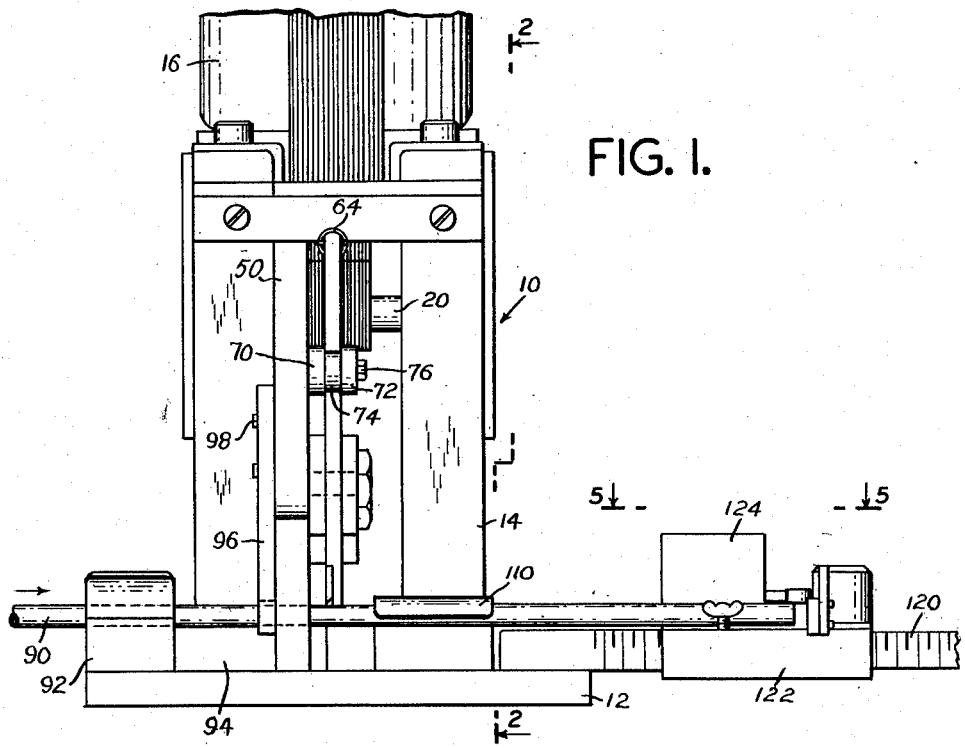
Fig. 1 is a side view of a cut-off device made in accordance with this invention, showing a forwardly moving extruded plastic tube passing through said device.

The cut-off device 10 herein claimed has a base 12 and a frame 14 standing on said base. Supported on top of said frame is a solenoid 16 having a vertically movable plunger 18 depending therefrom. A crossbar 20 is attached to plunger 18. Secured to frame 14 are horizontal bars 22, 24, 26 and 28. Mounted on bars 22 and 24 are rubber pads or cushions 30 and 32. Secured to bars 26 and 28 are rubber cushions 34 and 36 and secured to said last mentioned cushions are rubber pads 38 and 40. It will be observed in Fig. 4 that when the solenoid is de-energized and plunger 18 is dropped to an inactive position, crossbar 20 engages cushions 30 and 34 to soften the impact of the downwardly moving plunger. By the same token, when the solenoid is energized, said crossbar 20 engages pads 38 and 40 on the upward or power stroke of plunger 18 and the impact or shock of such movement is thereby absorbed.

A vertical plate 50 is part of frame 14 or is secured thereto, as desired. Pivotally mounted on plate 50 by means of bolt 52 is a lever 54. A link 56 is pivotally secured at its upper end to crossbar 20 and at its lower end to lever 54 by means of a bolt 58. It will be observed in Fig. 4 that lever 54 is a bifurcated member consisting of bars 54a and 54b respectively, link 56 being disposed between said bars. A generally vertical bar 60 is pivotally secured intermediate its ends by means of pin 62 to lever 54 and more particularly between the two bars 54a and 54b of said lever. The upper end of vertical bar 60 is connected to one end of a spring 64 and the opposite end of said spring is secured to the frame 14. As viewed in Fig. 3, the action of said spring is to pull vertical bar 60 in clockwise direction about the axis of pin 62.

Figure 2:
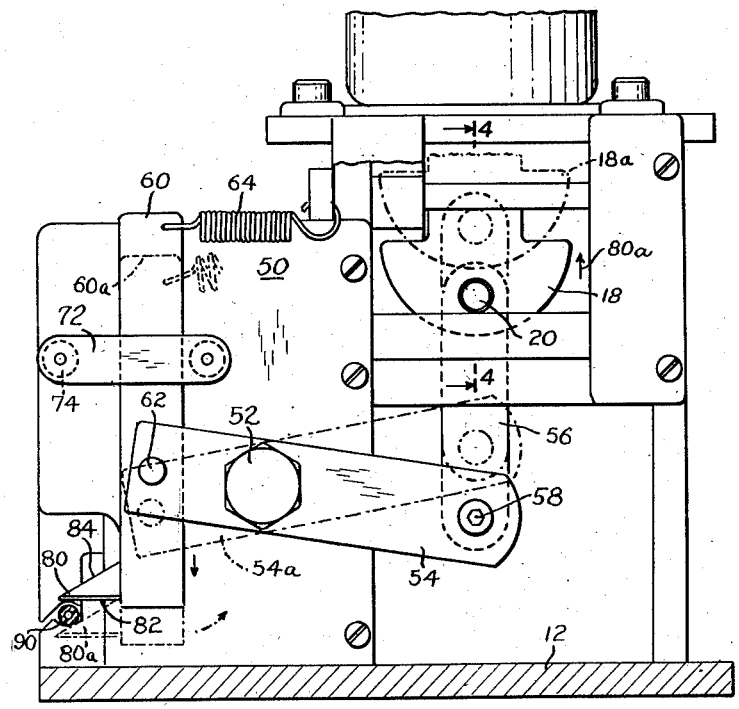
Fig. 2 is a vertical section on the line 2—2 of Fig. 1, comprising a front view of said cut-off device without the measuring mechanism.

Vertical bar 60 is loosely confined between a horizontal bar 70 which is secured to plate 50 and a second horizontal bar 72 which is held in parallel spaced relation to bar 70 by means of spacers 74. Screws 76 hold the two bars 70 and 72 and spacers 74 in position against plate 50. It will be noted in Fig. 3 that the distance between spacers 74 exceeds the width of vertical bar 60 and consequently said vertical bar 60 is free to move not only vertically but also horizontally within the limitations imposed. The interrupted lines 60a indicate one of the possible positions for vertical bar 60 other than its solid line position as shown in the same Fig. 3. The action of the parts thus far described is as follows:

When the solenoid is energized, core 18 is drawn upwardly as indicated by arrow 80a in Fig. 2, thereby pulling link 56 upwardly with it. This causes lever 54 to turn in counterclockwise direction as viewed in Fig. 2 from its solid line position to its dotted line position 54a. By the same token, vertical bar 60 is thrust downwardly from its solid line position to its dotted line position 60a. There is at this moment a tendency on the part of said vertical bar 60 to swing in counter-clockwise direction about the axis of pin 62 but this tendency is restrained by spring 64.

It will be observed that a cutter 80 is secured to the lower end of vertical bar 60, projecting laterally outwardly therefrom. The lower edge 82 of said cutter is sharp and constitutes the cutting edge thereof. When vertical bar 60 is in a perfectly vertical position, said cutting edge 82 extends on a substantially horizontal line. The upper edge 84 of the cutter is a relatively dull edge and it will be observed that it extends at an acute angle relative to cutting edge 82. This dull diagonal edge 84 constitutes a camming edge for a purpose which will shortly be described.

The extruded plastic tube or rod 90 moves forwardly (rightwardly as viewed in Fig. 1) from the extruding press and it is supported on the cutting device herein claimed by means of a bracket 92. This bracket includes a grooved block 94 which supports the plastic tube up to the cutting station. Above said grooved block 94 is a gauge bar 96 which is adjustably secured to plate 50 by means of screws 98. This gauge bar 96 is provided with a grooved lower end 100 which cooperates with the grooved block 94 to form an arcuate passageway for the plastic tube, as viewed in Fig. 3. Gauge bar 96 may be raised or lowered to accommodate plastic tubes or rods of different diameters.

In the operation of the cutting device herein claimed, when the solenoid is energized, the cutter 80 is caused to move downwardly from its solid line position shown in Fig. 2 to its dotted line position 80a. Since the plastic tube happens to be disposed between these two positions of the cutter, the effect is that the cutter cuts through and severs the plastic tube. This is actually a shearing action, the plastic tube being sheared between the grooved block 94 on the one hand and cutter 80 on the other hand. The movement of the cutter is so fast that the plastic tube is severed without measurable or noticeable resistance to the forward movement of the plastic tube. Gauge bar 96 prevents the severed plastic tube, that is, the part that remains and not the part that is cut off, from jumping out of position in consequence of the cutting action.

Figure 3:
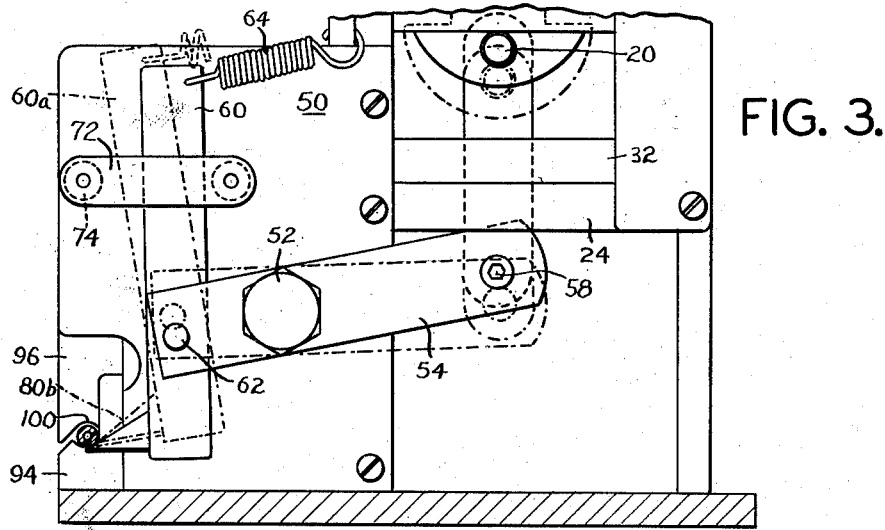
Fig. 3 is a view similar to that of Fig 2 but showing the cutter following a cutting operation and moving upwardly to retracted position.

The piece of plastic tubing that is thereby cut from the tubing being extruded is now free to fall into a collecting receptacle or down a chute or the like. A strap 110 extends across the top of the piece of tubing which is severed from the main body of the tubing to prevent said piece of tubing from jumping upwardly or laterally by reason of the cutting operation and said strap tends to deflect said piece of tubing downwardly into the chute or receptacle (not shown). Once this severed piece of plastic tubing drops downwardly, the solenoid is de-energized for a reason which will shortly appear and the plunger or core of the solenoid drops from its dotted line position 18a in Fig. 2 to its solid line position therein. This causes the vertical bar 60 to move upwardly and to carry the cutter 80 along with it. By this time, the extruded plastic tube has moved forwardly a sufficient distance to obstruct the upward movement of the cutter. It is at this point that the diagonal edge 84 of the cutter functions as a cam to cam the cutter laterally as it moves upwardly to avoid traversing the path of the forwardly moving plastic tube. This is shown in Fig. 3 where the dotted line position 80b of the cutter evidences a lateral as well as a vertical movement of the cutter from its solid line position in said Fig. 3. This lateral movement of the cutter is possible since vertical bar 60 on which it is mounted is free to pivot on pin 62 and to move from its solid line position in Fig. 3 to its dotted line position 60a in said Fig. 3. This pivotal movement of vertical bar 60 takes place against the action of spring 64 and consequently when the cutter completely passes the extruded plastic tube, the spring is able to return said vertical bar 60 to its vertical position as shown in Fig. 2 with its cutter poised above the plastic tube ready for the next cutting stroke.

Figures 4, 5:
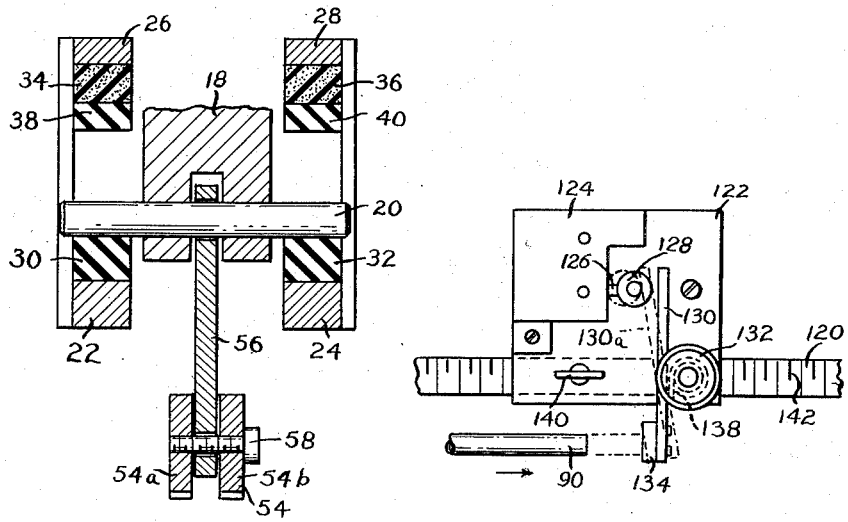
Fig. 4 is a fragmentary sectional view on the line 4—4 of Fig. 2.
Fig. 5 is a fragmentary top view of the measuring mechanism looking in the direction of arrows 5, 5 of Fig. 1.

A track 120 is secured to base 12 in parallel relation to the path of movement of the forwardly moving plastic tube. This is shown in Figs. 1 and 5. Slidably mounted on track 120 is a block 122 which carries a micro-switch 124. The switch arm is designated as 126 in the drawing and it will be noted that mounted on said arm is a roller 128. A gauge bar 130 is pivotally mounted on a vertical support 132. One end of said gauge bar is engageable with roller 128. A pad 134 is affixed to the opposite end of said gauge bar 130 and it will be noted that said pad 134 is situated in the path of the forwardly moving plastic tube 90. When the plastic tube engages said pad 134, it causes the gauge bar 130 to pivot in counter-clockwise direction as viewed in Fig. 5 from its solid position to its dotted line position 130a. This brings the gauge bar into contact with roller 128 and thereby actuates the micro-switch. The micro-switch is connected by conventional means (not shown) to the solenoid so that the actuation of the microswitch by the gauge bar 130 causes a circuit to the solenoid to close and thereby to energize said solenoid.

A spring 138 acts upon vertical support 132 to urge it in clockwise direction. Consequently, after the solenoid is energized and the forward end of the plastic tube is severed from the main body of the tube, gauge bar 130 is free to return to its solid line position in Fig. 5 under the influence of spring 138. It will also be understood that switch arm 126 of the micro-switch is also spring-urged outwardly by conventional means. Consequently, the action of both springs on gauge bar 130 causes it to return very quickly to its original solid line position. This opens the micro-switch and breaks the circuit to the solenoid, thereby de-energizing the solenoid. It is at this moment that the core or plunger of the solenoid drops and causes the cutter to retract to its inoperative but ready position.

It has been stated that block 122 is slidably mounted on track 120. A clamp screw 140 is provided to lock said block in place on said track. The track may be provided with calibrations 142 to accurately position the block on said track. It will be understood that the position of block 122 on track 120 will determine the length of plastic tubing to be severed.

The foregoing illustrates a preferred form of this invention and it will be understood that this preferred form may be modified and other forms may be provided within the broad spirit of the invention and the broad scope of the claim.

I claim:

A cutting device for cutting continuously moving extruded rod or the like without obstructing its movement, said cutting device comprising a frame which is adapted to support extruded rod moving continuously longitudinally of itself, a solenoid mounted on said frame with its core substantially vertically aligned and adapted for upward movement when the solenoid is energized, and downward movement when the solenoid is de-energized, the downward movement of said core being caused by gravity, a generally horizontal lever mounted on said frame for pivotal movement about a horizontal axis parallel to the path of movement of the extruded rod, one end of said lever being operatively connected to the solenoid core, a generally vertically disposed bar pivotally connected intermediate its ends to the opposite end of said lever for pivotal movement about a horizontal axis which is also parallel to the path of movement of the extruded rod, a stop member on said frame which is engageable with one side of said vertically disposed bar when the bar is in vertical position, a spring being connected between said frame and the upper end of said vertically disposed bar to tensionally hold it in vertical position, said vertically disposed bar being free to pivot out of vertical position against the action of said spring, a second stop member being provided on said frame a spaced distance from the opposite side of said vertically disposed bar to limit such pivotal movement of the vertically disposed bar, and a cutter attached to the lower end of said vertically disposed bar adjacent and above said path of movement of the extruded rod, the lower edge of said cutter facing said extruded rod constituting its cutting edge, the upper edge of said cutter sloping downwardly and away from said vertically disposed bar and constituting a cam edge, whereby energizing the solenoid causes upward movement of its core and pivotal movement of the lever, thereby causing the vertically disposed bar to move downwardly and to bring the cutting edge of the cutter into engagement with the extruded rod and to cut through said extruded rod, and whereby de-energizing the solenoid causes its core to drop and to pivot the lever in the opposite direction, thereby causing the vertically disposed bar to move upwardly and to bring the cam edge of the cutter into camming engagement with that portion of the extruded rod which follows the cut portion, said cutter being thereby cammed laterally out of the path of said extruded rod by causing the vertically disposed bar to pivot on said lever against the action of said spring, said vertically disposed bar being adapted to pivot back to vertical position under the influence of said spring after the cutter clears the extruded rod, thereby returning the cutter to its original position above the path of movement of said extruded rod and preparatory for the next cutting operation.

References Cited in the file of this patent

UNITED STATES PATENTS

| | | |
|---|---|---|
| 476,632 | Groff | June 7, 1892 |
| 1,128,721 | Ray and Ray | Feb. 16, 1915 |
| 1,619,305 | Norris | Mar. 1, 1927 |
| 1,744,818 | Warsen | Jan. 28, 1930 |
| 2,138,111 | Long | Nov. 29, 1938 |
| 2,362,088 | Payne | Nov. 7, 1944 |
| 2,400,793 | Tuska | May 21, 1946 |